United States Patent [19]

DeFilippi et al.

[11] 4,349,415
[45] Sep. 14, 1982

[54] PROCESS FOR SEPARATING ORGANIC LIQUID SOLUTES FROM THEIR SOLVENT MIXTURES

[75] Inventors: Richard P. DeFilippi, Cambridge; J. Edward Vivian, Arlington, both of Mass.

[73] Assignee: Critical Fluid Systems, Inc., Cambridge, Mass.

[21] Appl. No.: 79,935

[22] Filed: Sep. 28, 1979

[51] Int. Cl.$^3$ .......................... B01D 3/34; B01D 11/04
[52] U.S. Cl. ........................................ 203/14; 203/16; 203/17; 203/18; 203/19; 203/26; 203/43; 203/49; 203/73; 203/88; 208/339; 208/353; 208/361; 210/634; 560/261; 562/608; 568/410; 568/749; 568/869; 568/916
[58] Field of Search ..................... 203/14–19, 203/26, 49, 24, 73, 78, 80, DIG. 20, 88, 98, 43–46, 39; 202/180; 210/634; 196/14, 52; 208/339, 352, 353, 361; 422/256–260; 560/261; 562/608; 568/410, 749, 869, 916

[56] References Cited

U.S. PATENT DOCUMENTS

| | | | |
|---|---|---|---|
| 2,130,147 | 9/1938 | Milmore | 208/319 |
| 2,281,865 | 5/1942 | Van Dijck | 260/428 |
| 2,282,982 | 5/1942 | Jewett | 203/24 |
| 3,098,107 | 7/1963 | Becker | 203/26 |
| 3,349,007 | 10/1967 | Ciborowski et al. | 203/26 |
| 3,423,293 | 1/1969 | Holden | 203/26 |
| 3,477,856 | 11/1969 | Schultz | 426/424 |
| 3,568,457 | 3/1971 | Briggs et al. | 203/26 |
| 3,806,619 | 4/1974 | Zosel | 203/49 |
| 3,966,981 | 6/1976 | Schultz | 426/425 |
| 3,969,196 | 7/1976 | Zosel | 203/49 |
| 4,035,243 | 7/1977 | Katz et al. | 203/DIG. 14 |
| 4,161,249 | 7/1979 | Baiel et al. | 203/26 |
| 4,177,137 | 12/1979 | Kruse | 203/26 |

Primary Examiner—Wilbur L. Bascomb, Jr.
Attorney, Agent, or Firm—Schiller & Pandiscio

[57] ABSTRACT

Process and apparatus for extracting an organic liquid from an organic liquid solute/solvent mixture. The mixture is contacted with a fluid extractant which is at a temperature and pressure to render the extractant a solvent for the solute but not for the solvent. The resulting fluid extract of the solute is then depressurized to give a still feed which is distilled to form still overhead vapors and liquid still bottoms. The enthalpy required to effect this distillation is provided by compressing the still overhead vapors to heat them and indirectly to heat the still feed. The process is particularly suitable for separating mixtures which form azeotropes, e.g., oxygenated hydrocarbon/water mixtures. The energy required in this process is much less than that required to separate such mixtures by conventional distillation techniques.

32 Claims, 5 Drawing Figures

APPROXIMATE $CO_2$ STATE CONDITIONS

A - IN EXTRACTION COLUMN
    B - FEED TO STILL
    C - OVERHEAD FROM STILL
    D - COMPRESSOR DISCHARGE

PROCESS FOR SEPARATING ORGANIC LIQUID SOLUTES FROM THEIR SOLVENT MIXTURES

This invention relates to a process and apparatus for solvent extraction and more particularly to a process and apparatus for extracting large volumes of liquid organics from solution.

In the commercial processes used for manufacturing many of the high-volume, liquid organic compounds such as oxygenated hydrocarbons, it is necessary, usually as a final step, to separate the organic compounds from aqueous solutions. In many of these mixtures water constitutes a major portion of the solution; and in a large number of these cases the water and organic liquids form azeotropes. Thus, the separation of many of these organic compounds from water requires relatively large and complex distillation equipment and demands a heavy expenditure of energy. Likewise, petroleum fuel fractions and light hydrocarbons must be separated from other organics such as higher boiling hydrocarbons with which they are miscible.

At present, about 3% of the total national energy consumption in the United States is used for distillation processes in petroleum refining and chemical production. It is therefore obvious that if a process and apparatus could be provided which materially decreased the energy requirements for separating even a portion of such solutes from their solutions, the savings in energy would be highly desirable.

It is therefore a primary object of this invention to provide an improved process for extracting liquid organic solutes such as petroleum fuel fractions, straightrun petroleums, light hydrocarbons and aromatics from organic solvents and oxygenated hydrocarbons and the like from admixtures with water. It is another object of this invention to provide a process of the character described which requires less energy input per unit of organic liquid extracted than is now required in the presently used distillation processes. An additional requirement is to provide such a process which makes it possible to employ distillation equipment having fewer stages in smaller and less complex distillation equipment than now used. Yet a further object is provide a process for extracting such liquid organic solutes from their solvents using liquid or supercritical carbon dioxide as an extractant which makes it possible to take advantage of many of the unique physical properties of this extractant including favorable diffusion coefficients, low viscosity and low heat of vaporization. A still further object of this invention is to provide such a process which uses a fluid extractant, i.e., carbon dioxide, which is nonpolluting, nontoxic and relatively inexpensive.

Another primary object of this invention is to provide improved apparatus for extracting organic liquid solutes from their solutions, the improvement lying in a combination of apparatus components. An additional object is to provide apparatus of the character described which makes possible the use of a fluid solvent with resulting savings in energy requirements.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 illustrates the near critical/supercritical regime of carbon dioxide and the solubility of naphthalene within this regime;

Figure 2:
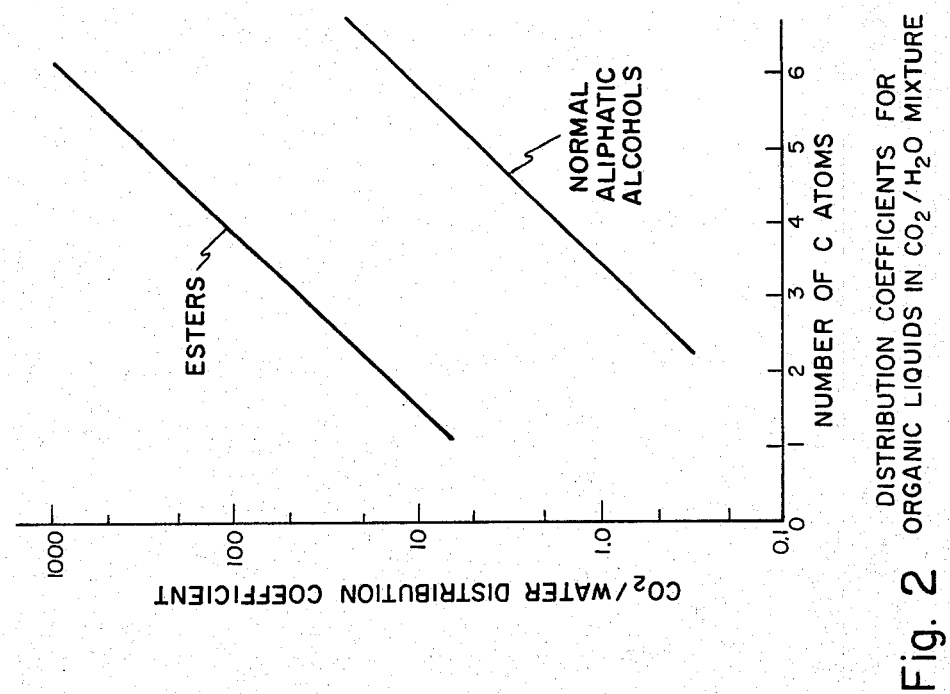
FIG. 2 is a plot of the relationship between carbon number of representative organic liquids to be extracted from water and the $CO_2$-water distribution coefficient for the liquids.

According to one aspect of this invention there is provided a process for separating an organic liquid from an organic liquid/solvent mixture, comprising the steps of contacting a mixture of an organic liquid solute and a solvent for said solute with an extractant fluid under conditions of temperature and pressure to render said extractant fluid a solvent for the organic liquid solute but not for said solvent, thereby forming a fluid extract of the organic liquid solute in the extractant fluid and a raffinate comprising said solvent with minor amounts of the extractant fluid and organic liquid solute; separating the fluid extract and the raffinate; reducing the pressure on the fluid extract to a level to form a two-phase still feed; distilling the still feed to produce a still overhead and liquid still bottoms; recompressing the still overhead to provide recompressed vapor at an elevated temperature; effecting indirect heat exchange between the recompressed vapor and the still bottoms to provide the thermal energy required in the distilling step and to form a liquid condensate of the vapor; and recovering a liquid bottoms product comprising the liquid solute.

In a preferred embodiment of this process the fluid extractant is recovered for recycling. In a further preferred embodiment carbon dioxide is used as the fluid extractant.

According to another aspect of this invention there is provided apparatus for separating an organic liquid from an organic liquid/solvent mixture, comprising in combination pressure vessel means for effecting contact between a mixture of an organic liquid solute and a solvent for the solute and a pressurized extractant fluid which is a solvent for the organic liquid solute but not for the solvent to produce a fluid extract of the organic liquid solute and a raffinate comprising solvent with minor amounts of the extractant fluid and the organic liquid solute; distillation vessel means capable of separating a still feed into an overhead vapor and liquid bottoms and having associated therewith reboiler means including heat exchange means for circulating a heat transfer fluid therethrough in indirect heat exchange relationship with the liquid bottoms; first pressure reducing means; first pressure line means incorporating the pressure reducing means arranged to convey the fluid extract at a reduced pressure as a two-phase still feed from the pressure vessel means to the distillation vessel means; vapor compressor means; second pressure line means incorporating the vapor compressor means arranged to convey the overhead vapor to the vapor compressor means and recompressed vapor therefrom to the heat exchange means; second pressure reducing means; separator means; third pressure line means incorporating the second pressure reducing means arranged to convey the still bottoms from the reboiler means to the second pressure reducing means and decompressed still bottoms therefrom to the separator means; and means to recover the still bottoms from the separator means as product organic liquid solute.

The ability of carbon dioxide as a liquid in its near critical state and as a fluid in its supercritical state to serve as an extracting solvent has been known for a number of years. (See for example Francis, A. W., J. Phys. Chem. 58, 1099 (1954) and Ind. Eng. Chem. 47, 230 (1955).) Near critical and supercritical fluids, including carbon dioxide, have been suggested as solvents for a wide range of materials including various oils (U.S. Pat. Nos. 1,805,751, 2,130,147, 2,281,865); flavor components (U.S. Pat. No. 3,477,856); caffein in coffee (U.S. Pat. No. 3,843,832); cocoa butter from a cocoa mass (U.S. Pat. No. 3,923,847); fats from grains and the like (U.S. Pat. No. 3,939,281); residual hexane from de-fatted grain (U.S. Pat. No. 3,966,981); and a variety of materials such as paraffins, glycerol, oils and fats from a variety of compositions (U.S. Pat. No. 3,969,196). A very detailed review of the general field of extraction with supercritical gases is to be found in Angewandte Chemie—International Edition in English, 17: 10, pp 701–784 (October 1978). Of particular interest is the flow sheet of a pilot plant for continuous "destraction" of petroleum top-residues with propane appearing as FIG. 5 on page 707 of the Angewandte Chemie reference.

Despite the fact that the solvation properties of gases in their near critical and supercritical states, and especially of liquid and supercritical carbon dioxide, have been known, the application of such properties has not been made on any commercial scale to the large-volume organic liquids; and more importantly it has not been made in a manner to materially reduce energy requirements below that point at which the added costs incurred in handling elevated gas pressures are more than offset to provide an appreciable overall net savings. The process and apparatus of this invention make the attainment of such net savings possible.

Many compounds which are gases at ambient temperature and pressure can be converted to supercritical fluids by subjecting them to conditions such that they are at or above their critical pressures and temperatures. At pressures and/or temperatures somewhat below the critical points, most of these gases may be liquefied to attain what is termed their near-critical state. These gases in their near-critical liquid or supercritical fluid state become good solvents for many organic materials. It is therefore feasible to refer to them as being in a solvent condition, the actual temperature and pressure for any one fluid in its solvent condition being readily determinable for the solute to be separated and recovered.

Among those gases which may be converted to the solvent-condition fluid state are hydrocarbons such as methane, ethane, propane, butane, ethylene, and propylene; halogenated hydrocarbons such as the halomethanes and haloethanes; and inorganics such as carbon dioxide, ammonia, sulfur dioxide, nitrous oxide, hydrogen chloride and hydrogen sulfide. Suitable mixtures of these gases may also be used.

Of these gases which may be in the solvent condition, carbon dioxide, ethylene and ethane may be used as illustrative of the temperatures and pressures required. These gases are of particular interest because they fall within the near-critical and supercritical regimes at essentially ambient temperature and have critical pressures in the range of 50 to 75 atmospheres—pressures which are readily handled by existing equipment components. The critical temperature and pressure for each of these gases are well known and, as noted, the solvent condition temperature and pressure ranges can readily be determined. For example, carbon dioxide has a critical temperature of 31° C. and its solvent condition temperature may range between about −40° C. and about 150° C. The critical pressure of carbon dioxide is 73 atmospheres and its solvent condition pressure may range between about 30 and 150 atmospheres.

Figure 1:
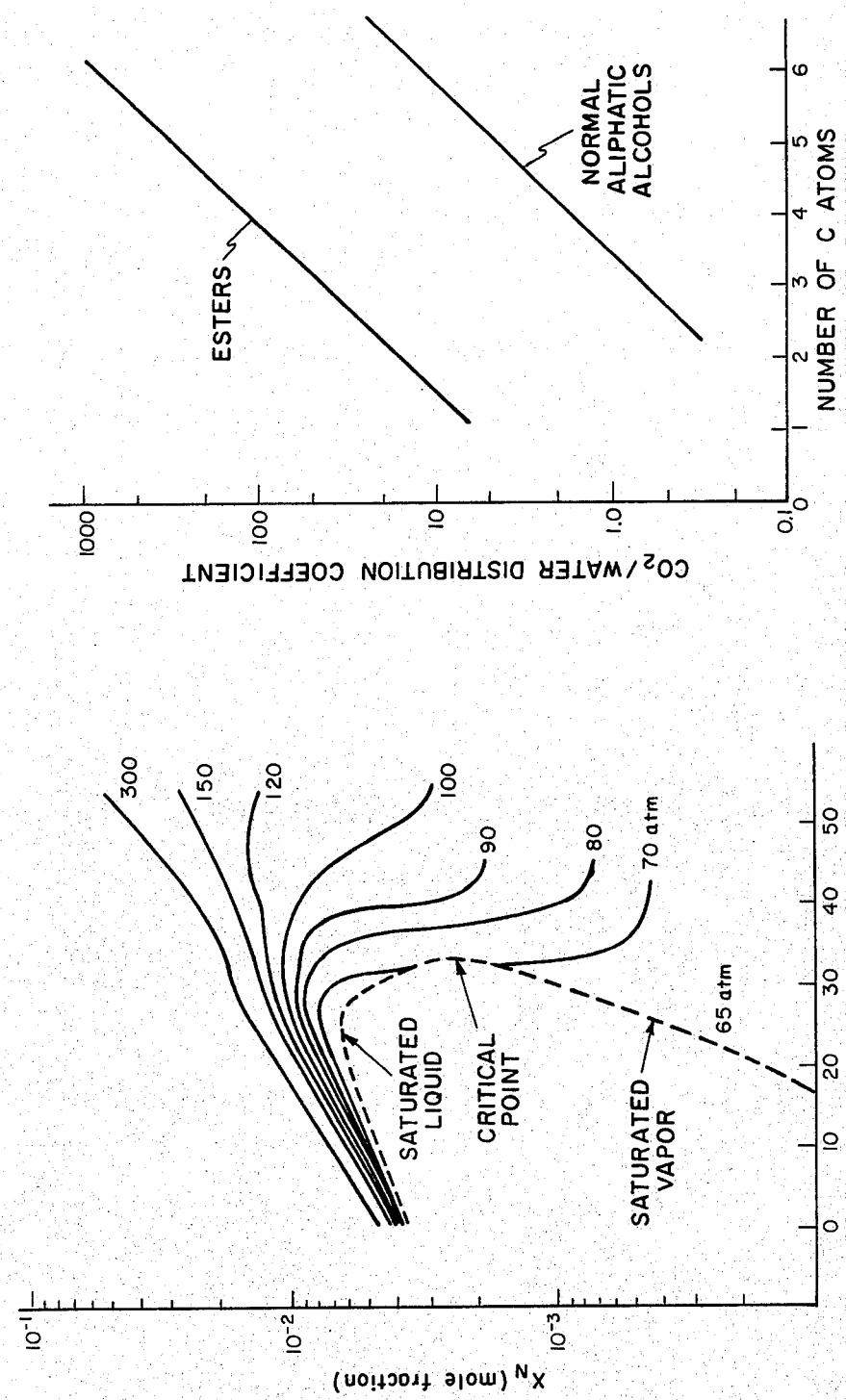

Illustrative of the solvent powers of carbon dioxide in the solvent condition is the diagram for the solubility of naphthalene in carbon dioxide shown in FIG. 1. It will be seen that within the regime plotted in FIG. 1, the carbon dioxide has solvent properties similar to those of normal liquids.

Carbon dioxide in its solvent condition is a preferred fluid solvent extractant in the practice of this invention, for it possesses a unique combination of properties. In addition to its good solvent properties under the conditions used, it has distinctly favorable diffusion coefficients compared to normal liquids, a property which gives rise to high mass-transfer coefficients. This in turn offers the possibility of minimizing or even eliminating any significant transport resistance in the carbon dioxide phase resulting in an increase in the overall extraction rate. It also thereby offers the possibility of decreasing the size and more effectively optimizing the design of the distillation columns used.

A second favorable property of solvent-condition carbon dioxide is its low viscosity which is about a factor of ten less than that of conventional liquid solvents. Since viscosity enters into the flooding characteristics of an extraction column, high flooding velocities and thus higher flow capacities can be achieved with a concomitant reduction in distillation column diameter.

The high volatility of carbon dioxide relative to many of the large-volume organic liquids, e.g., ethanol, methyl ethyl ketone, and the like which are to be extracted from a water mixture, means that the distillation column may operate as an evaporator with a short stripping section using fewer stages. Most important, the vapor rate, and thus the boiler heat requirement is low. Moreover, the heat of vaporization of the solvent-condition carbon dioxide is very low—being about one-fifth of that of many normal liquid solvents and about one-thirteenth that of water.

Finally, carbon dioxide is inexpensive, nonpolluting and nontoxic, requiring no special equipment or procedures for storage and handling beyond normal practice for pressure systems.

The use of solvent-condition fluids according to the process of this invention is applicable to the extraction of a wide range of organic liquid solutes from their solutions, whether the solvent to be extracted from them is water or another organic liquid, so long as the solvent is relatively immiscible with the fluid extractant under the conditions of temperature and pressure employed. Such organic liquid solutes include, but are not limited to, petroleum fuel fractions derived from catalytic cracking and hydrocracking, straight-run petroleum fractions and light hydrocarbons; aromatics such as styrene and o-xylene; and water-miscible oxygenated hydrocarbons including the aliphatic alcohols such as ethanol, isopropanol and the like; the polyhydric alcohols; as well as acids, aldehydes, esters and ketones.

Since the separation of oxygenated hydrocarbons from water mixtures constitutes an important commercial process, the extraction of this class of solute from an aqueous solution will be used hereinafter as illustrative of the process and apparatus of this invention. More particularly, ethanol is taken as an example of a liquid organic solute. Ethanol is totally miscible with and forms an azeotrope with water which contains 89.4 mol % ethanol. The energy consumed in the distillation of this mixture is 9008 Btu per pound of alcohol product. The 1976 sales volume in the United States of synthetic ethanol was $890 \times 10^6$ pounds, indicating that some $8 \times 10^{12}$ Btu were consumed in the separation of synthetic ethanol/water mixtures. It becomes obvious from this one illustration alone that the reduction in the energy required to produce such organic liquid intermediates as ethanol is highly desirable.

In the practice of this invention it is necessary to chose a solvent condition fluid extractant which exhibits an extractant/water distribution coefficient for the organic liquid solute of sufficient magnitude to ensure that the organic liquid solute will be picked up in the extractant in preference to the water. Generally a distribution coefficient of at least 0.1 under the conditions of temperature and pressure used is preferred. These distribution coefficients may readily be determined either from the literature or by simple experimentation in order to use the optimum conditions for any given extractant-organic liquid system. For example, it will be seen from FIG. 2, which is a plot of the relationship between distribution coefficient and number of carbon atoms in normal aliphatic alcohols and in esters, that this coefficient increases rapidly with carbon number. However, even with distribution coefficients less than one, as in the case of ethyl alcohol, the process of this invention can provide material savings in energy as discussed below.

An important feature of the process of this invention is the use of solvent extractant vapor recompression in combination with the use of a solvent-condition fluid extractant. This makes possible the utilization of the overhead vapor enthalpy as the boiler heat source. In order to accomplish this, the temperature at which the heat is delivered from the vapor must be raised to provide a $\Delta T$ driving force for heat transfer to the still bottoms in the boiler. This is achieved by vapor compression, so that condensation and enthalpy release will occur at a temperature higher than the boiling point of the boiler liquid.

Figure 3:
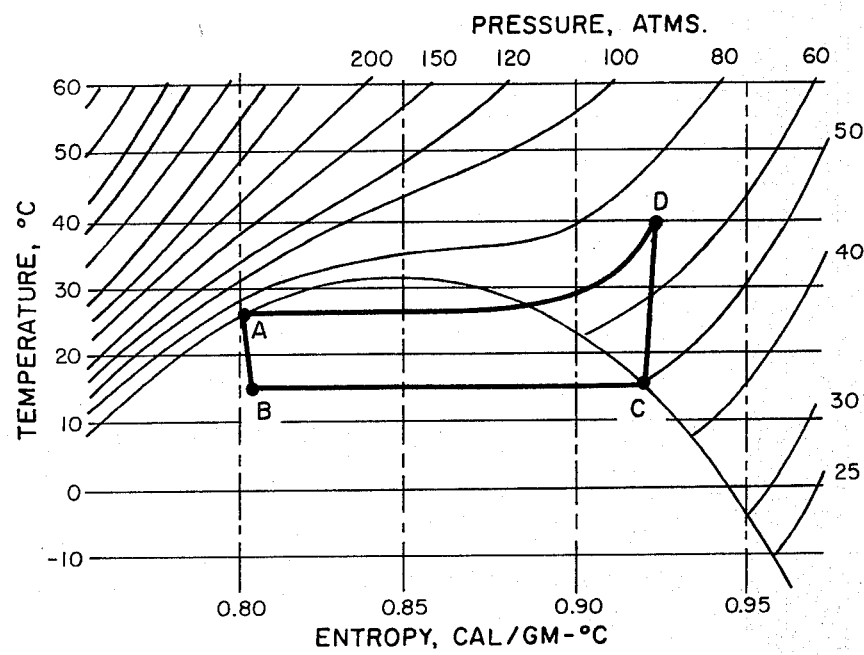
FIG. 3 is a plot of an exemplary vapor recompression cycle for carbon dioxide on a fragment of a temperature-entropy diagram for carbon dioxide.

Again using carbon dioxide as exemplary of the solvent-condition fluid extractant, it is possible to show a typical vapor-recompression cycle on the carbon dioxide temperature-entropy diagram of FIG. 3. In this example, the solvent-condition carbon dioxide leaving the extraction column is at point A, here taken to be 25° C. and 65 atmospheres which means that the extractant is being used in its near critical liquid state. Upon expansion into the distillation column, the stream constituting the still feed drops in pressure at constant enthalpy to 50 atmospheres. This is point B which in this example represents about 22% vapor and 78% liquid at 15° C. In the reboiler, enthalpy is added and liquid is vaporized to point C, representing all vapor at the same pressure and temperature. Finally, this vapor, passing overhead from the distillation column, is then compressed to point D and, in giving up enthalpy in the reboiler, the stream returns from point D to point A.

Figure 4:
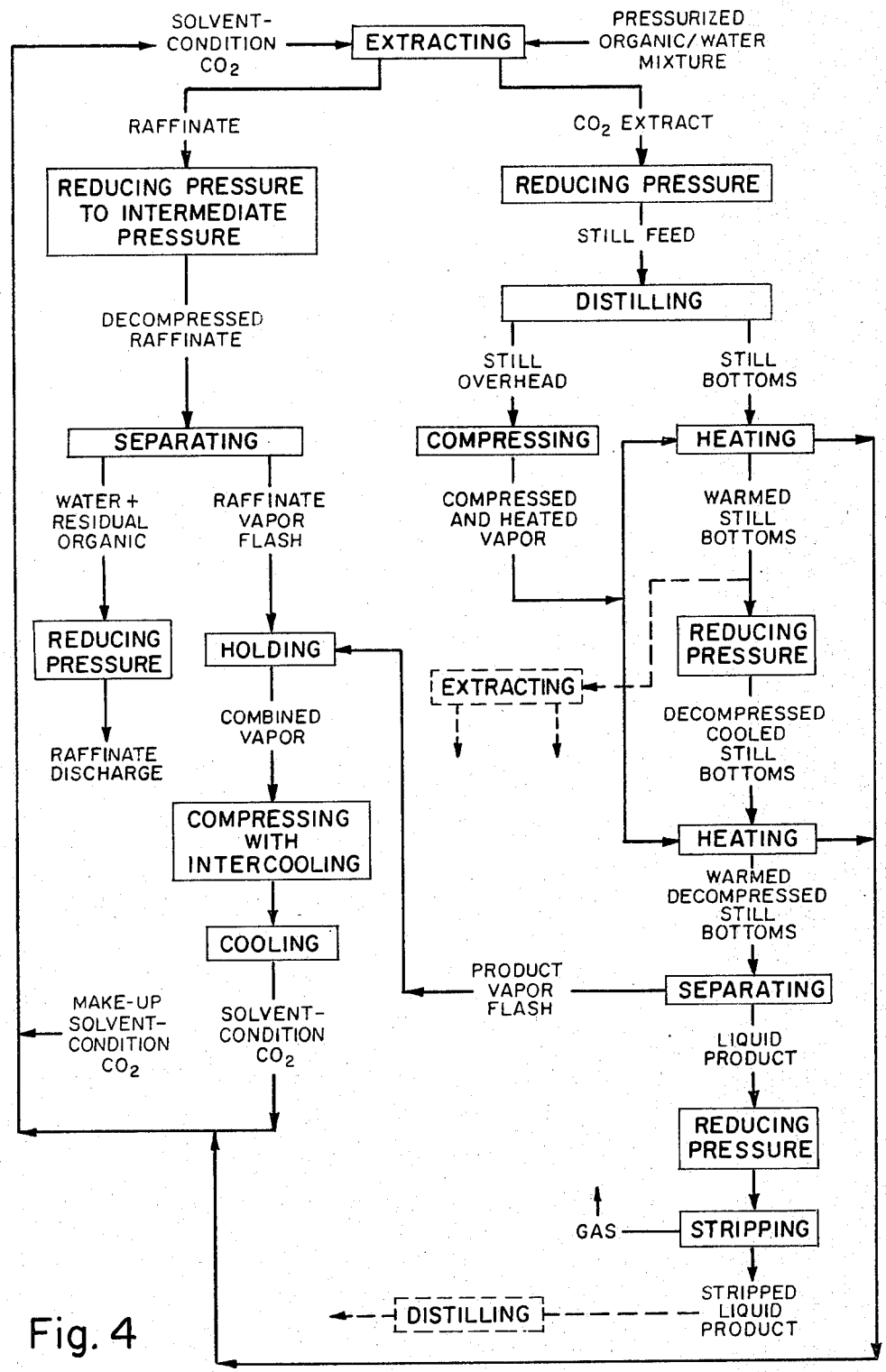
FIG. 4 is a detailed flow chart of the method of this invention using carbon dioxide as the extractant and an oxygenated hydrocarbon, e.g., ethanol in water as the solution.
Figure 5:
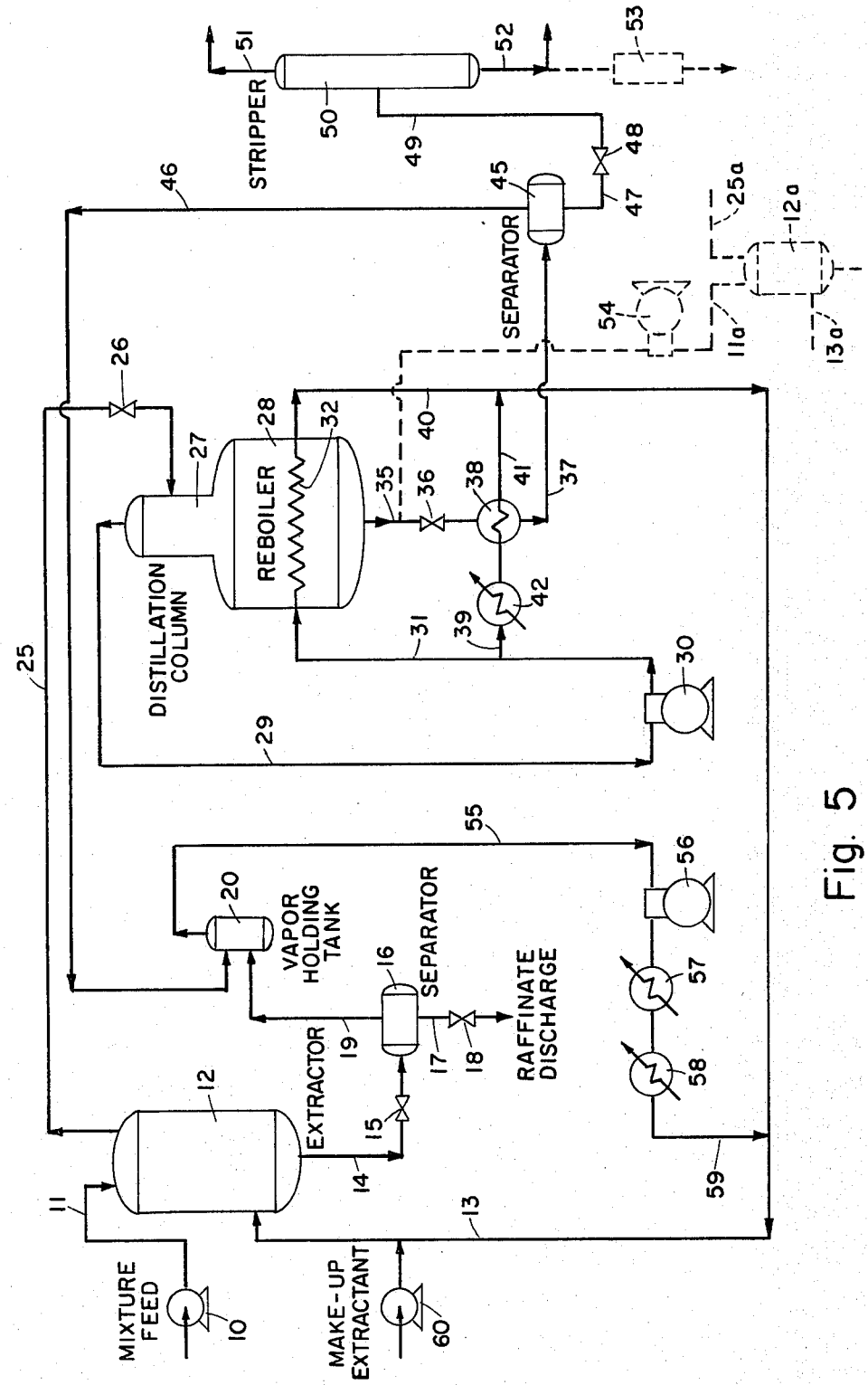
FIG. 5 is a diagram of the apparatus and system of this invention.

The steps of the process of this invention are detailed in the flow chart of FIG. 4 and the apparatus is diagrammed in FIG. 5. Reference should be had to both of these drawings in the following detailed description. Again, carbon dioxide is used for purposes of illustration as the extractant and ethyl alcohol as the liquid organic solute.

The organic liquid/water mixture feed is pressurized and pumped by pump 10 through a suitable pressure line 11 into a pressure vessel 12 designed to provide for the contacting of the feed mixture with the solvent-condition gas extractant introduced into pressure vessel 12 through line 13. For convenience of describing this process and apparatus, it will be assumed, for illustrative purposes only, that the feed mixture is water/ethanol and the fluid extractant is carbon dioxide. The extractor 12 may be any suitable pressure vessel designed to provide efficient liquid-liquid contact, such as by countercurrent flow in a packed or sieve-plate tower.

The liquid raffinate, comprised of water, carbon dioxide and a very small residual amount of ethanol, is withdrawn from extractor 12 through line 14 and a pressure-reducing value 15; and the resulting decompressed raffinate is a two-phase mixture of liquid water, with a small amount of dissolved carbon dioxide as well as the residual ethanol, and carbon dioxide vapor. The water phase is withdrawn through line 17 and pressure-reducing valve 18 to become the raffinate discharge. The carbon dioxide forming the vapor phase is transferred from separator 16 by line 19 to a vapor holding tank 20 for subsequent reconversion to the solvent condition as detailed below.

The liquid carbon dioxide extract containing the dissolved ethanol is withdrawn from extractor 12 under the same conditions as obtained in the extractor and transferred by pressure line 25 through pressure reducing valve 26 to the distillation column 27. The reduction of pressure, e.g., down to 50 atmospheres, experienced by the carbon dioxide extract produces a still feed, which is part liqid, part vapor, at a lower temperature, e.g., about 15° C. The distillation column 27 is provided with sufficient stages to ensure that essentially all of the ethanol collects in the reboiler 28 along with liquid carbon dioxide forming the still bottoms.

It will be appreciated that these operational conditions are illustrative and not limiting. For example, the carbon dioxide extract pressure may be reduced to between about 30 and about 80 atmospheres prior to its introduction into distillation column 27; and the resulting still feed may range between about 0° and 31° C.

In keeping with an important feature of this invention, the heat supplied to reboiler 28 is provided through out-of-contact or indirect heat exchange with recompressed carbon dioxide vapor drawn from the overhead of distillation column 27 and sent through line 29, compressor 30, and line 31 into heat exchanger coils 32 in reboiler 28. In an alternative embodiment, reducing valve 26 may be replaced by a turbine, the power output of which may be used to furnish at least a portion of the power required to drive compressor 30.

In vapor-recompression evaporation or distillation, the elevation in boiling point of the more-volatile component (here the extractant, e.g., carbon dioxide) caused by the presence of the less-volatile component (here the liquid organic solute) is important. The still overhead leaving the distillation column 27 through line 29 will be at or near the boiling point of the more-volatile component; and the liquid (a solution of the solute and extractant) in reboiler 28 will be at a higher temperature, the magnitude of the difference in temperature depending upon the boiling point elevation due to the presence of the solute.

The still overhead from distillation column 27 is compressed adiabatically in compressor 30 to add the enthalpy which must be transferred to the reboiler liquid to partially vaporize it while cooling and condensing the compressed vapor as it passes through heat exchanger 32. Thus the mechanism of vapor-recompression distillation requires that the still overhead must be heated by compression to a temperature high enough above the reboiler liquid temperature to provide an economical temperature-difference driving force to effect the necessary heat transfer within reboiler 28. Therefore it follows that the greater the boiling-point elevation due to the presence of the solute, e.g., ethanol, the greater is the compression required and the greater is the excess enthalpy that must be added by the compressor to provide an economical temperature-difference driving force for heat transfer. The magnitude of this excess can in some cases cause vapor recompression distillation to be uneconomical.

Since the boiling-point elevation for solutions of ethanol and carbon dioxide have not been found in the literature, a first approach involved the calculation of this parameter using known principles for colligative properties and assuming the applicability of Raoult's Law, a common technique for predicting vapor-liquid equilibrium data. Assuming a solution of 50% ethanol in carbon dioxide at 50 atmospheres, the calculated value for boiling point elevation is approximately 50° C., i.e., the temperature to which the reboiler liquid must be heated through indirect heat exchange with compressed carbon dioxide in heat exchanger 32 would have to be about 50° C. above the normal boiling point of carbon dioxide at 50 atmospheres pressure. However, the actual measured value of the boiling point elevation under these conditions is about 3° C. This great discrepancy between calculated and actual values for boiling point elevation may be attributed to the fact that carbon dioxide under the conditions employed does not obey Raoult's Law.

Thus if has been found that there exists an unexpectedly favorable low value for the boiling-point elevation in such carbon dioxide solutions as employed in the process of this invention. It will, of course be appreciated that such a low boiling-point elevation requires only a moderate increase in still overhead pressure. This means that a comparatively small amount of energy is required to compress the still overhead and hence to separate the solute from the liquid carbon dioxide extract. This, in turn, in part, gives rise to the low-energy characteristics associated with the process of this invention.

Following the example which is used to described FIGS. 4 and 5, the still overhead vapor sent to the compressor is under essentially the same conditions, 50 atmospheres and 15° C., which prevails in distillation column 27; while the compressed and heated vapor introduced into heat exchanger 32 is at 65 atmospheres (essentially the extraction pressure) and 36° C. As will be described below, a portion of the compressed and heated vapor from compressor 30 may be used to heat the expanded still bottoms from reboiler 28.

Transfer of heat to the liquid in reboiler 28, through heat exchange with the compressed and heated vapors, results in the boiling off of additional carbon dioxide. Because of its very low heat of vaporization, the heat supplied from the recompressed vapor is sufficient to boil off the carbon dioxide, a fact which results in the material reduction in energy requirements compared, for example, with the heat required in the distillation of a liquid organic/water mixture.

The warmed still bottoms are discharged from reboiler 28 through line 35 and pressure-reducing valve 36 from which they emerge at a pressure, e.g., 10 atmospheres, intermediate between the still pressure and atmospheric, and at a low temperature, e.g., −40° C. The decompressed cooled still bottoms are then brought back up to a temperature, e.g., to about 10° C., intermediate between that which they were discharged from valve 36 into line 37 and ambient temperature. This heating is accomplished within heat exchanger 38 using the compressed vapor slip stram drawn off line 31 through line 39 as a heat source. Because it is desirable to have the two streams of carbon dioxide condensate leaving heat exchanger 28 through line 40 and leaving heat exchanger 38 through line 41 at or near the extraction temperature, e.g., 28° C., it may be necessary to include a refrigeration means 42 in line 39 to remove enthalpy from the carbon dioxide before recycling it to the extractor.

The still bottoms at the intermediate pressure and temperature are carried by line 37 into a separator 45 from which the product vapor flash, consisting of carbon dioxide with only very small residual amounts of water and ethanol, is taken by line 46 to vapor holding tank 20 to be mixed with raffinate vapor flash. The liquid product ethanol is withdrawn from separator 45 through line 47, let down to atmospheric pressure in valve 48, and then conveyed as liquid via line 49 to a stripping tower 50 from which residual carbon dioxide gas is discharged through line 51 and product ethanol is withdrawn though line 52.

The combined carbon dioxide vapor in holding tank 20 must be converted to a solvent condition—in this example it must be compressed from 10 to 65 atmospheres and delivered to extractor 12 at 28° C. The vapor is therefore taken through line 55 to compressor 56 which is preferably a two-stage compressor with intercooling. The heat of compression is subsequently removed from the compressed carbon dioxide in one or more aftercoolers 57 and 58 prior to being carried by line 59 into condensate return line 40 which becomes extractant feed line 13. The necessary make-up solvent-condition carbon dioxide is brought into feed line 13 through a pump 60.

It will be apparent from the above description of the invention, as illustrated in FIGS. 4 and 5, that it is possible to carry out the process using a wide range of operational parameters so long as certain conditions are met. The fluid used for extracting the organic liquid must be at a pressure and temperature which make it a solvent for the organic liquid to be extracted. In selecting an appropriate solvent fluid it is preferable that the extractant fluid/water distribution coefficient of the organic liquid be at least 0.1 for the conditions used. The choice of conditions used to place the fluid extractant in either a near critical liquid state or in the supercritical fluid state will depend upon the physical properties of the gas; upon the solubility within these regimes of the organic liquid solute being extracted; and upon the solubility of the extractant fluid, e.g., carbon dioxide in the solvent, e.g., water, being removed. Thus the extract withdrawn from extractor 12 may be a liquid or a supercritical fluid or a combination of these, the term fluid being used to encompass any one of these forms. Generally it is preferable to choose those pressures and temperatures approaching the lower limits of the feasible working ranges because of the economics involved, both with respect to original capital expenditures and to operating costs.

Because it is necessary to maintain a two-phase system in the distillation column 27, the pressure of the extract must be reduced below the critical pressure of the gas extractant/organic liquid mixture prior to its introduction into the column. It is, however, desirable to maintain the pressure differential between the extractor 12 and distillation column 27 at a relatively low value to minimize the amount of energy required by the system. Such energy is primarily in the form of the compressor work required to return the extractant gas to the pressure used in the extractor.

The temperature of the still feed at its point of introduction in the distillation column will, of course, be determined by the pressure drop experienced by the extract in the pressure-reducing valve 26; while the temperature of the still bottoms must be maintained at the boiling point of the liquid. Although the still can be operated over a temperature range extending from just below the critical temperature of the still feed to just above the freezing point of the still bottoms, it is preferable to operate it as near to ambient temperature as the other named operational parameters permit.

The boiling point of the still bottoms, in turn, provides for the determination of an optimum temperature or temperature range for the compressed vapor into the heat exchanger 32 in boiler 28, which, in turn, provides for the determination of the optimum degree of compression of the still overhead by compressor 30. It is within the skill in the art to balance this degree of compression and the concomitant increase in temperature with the design and complexity of the heat exchange means within the reboiler.

The temperature of the compressed vapor entering heat exchanger 32, must of course, be higher than the boiling point of the still bottoms in order to provide the necessary $\Delta T$ heat exchange driving force. It is preferable that this $\Delta T$ be of sufficient magnitude to make it possible to use efficient but relatively uncomplicated heat exchange means. Essentially all of the heat exchange should take place as the vapor condenses in the boiler to establish the most thermally efficient system.

Finally, the intermediate pressures chosen for separators 16 and 45 will be those which achieve an optimum balance between the recovery of as much of the extractant fluid as possible and the requirement for as little work of compression as need be used.

In the conventional distillation of azeotrope-forming mixtures, the resulting product solute may require additional azeotropic distillation in those cases in which the product is leaner in solute than the azeotropic composition. In the process of this invention, however, the fluid solvent and process conditions may be chosen to provide a product solute which is richer in solute than the corresponding azeotrope composition, thereby making it possible to eliminate the more difficult and energy-consuming azeotropic distillation step and to substitute conventional distillation for it. Therefore, in some cases where sufficient solvent remains in the organic liquid solute product, it may be desirable to subject the product liquid withdrawn through line 52 to a final distillation step in conventional distillation apparatus 53. Such an optional final distillation step will, of course, require far less energy than would be required to effect the separation of the liquid organic solute and solvent solely by conventional distillation followed by any necessary azeotropic distillation.

It is also within the scope of this invention to subject the liquid bottoms product discharged from reboiler 28 to a second extraction using essentially the same process and apparatus as that previously described. Thus as indicated in dotted lines in FIGS. 4 and 5, the pressurized still bottoms discharged through line 35 may be taken by way of line 54 and pump 55 into a second extractor 12a into which extractant is introduced through line 13a and carbon dioxide extract is withdrawn through line 25a. Since the still bottoms withdrawn from reboiler 28 will be a pressure and a temperature which are somewhat below the pressure and temperature at which extractor 12a operates, some compression of these still bottoms will be required. It may also be necessary to adjust the temperature of the resulting compressed extractor feed through suitable heat exchange means (not shown). Finally, inasmuch as the still bottoms providing the feed for extractor 12a contain some carbon dioxide, the amount of extractant brought into that extractor is adjusted to take this into account.

The individual apparatus components are either presently available or can be readily designed and constructed using available information concerning materials and performance of related available components. In the case of some of the components it may be found desirable to use specific embodiments or modifications of known equipment to achieve an optimum design balance in the overall system. Thus, for example, it may be desirable to use a pulsed extraction column to ensure that the small droplets of water making up the discontinuous phase are efficiently suspended throughout the extractor liquid during contacting and extracting.

Since essentially all of the apparatus components—vessels, lines, valves, heat exchangers, separators, distillation columns and reboiler—must be operated at pressures above ambient, it is desirable to choose as the fluid extractant, a gas having a relatively low critical pressure, i.e., below about 100 atmospheres. Likewise those gases, the critical temperatures of which are relatively low and preferably not far from ambient temperatures are preferred.

Through the use of the process and apparatus of this invention it is possible to materially reduce the energy requirements for separating organic liquids from their water mixtures. Inasmuch as many such organic liquids are produced in very large volumes, the realization of a reduction in even a portion of the energy now required would be highly desirable.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

We claim:

1. A process for separating an organic liquid from an organic liquid/solvent mixture, comprising the steps of
   (a) contacting a mixture of an organic liquid solute and a solvent for said solute with an extractant fluid under conditions of temperature and pressure to render said extractant fluid a solvent for said organic liquid solute but substantially less for said solvent, thereby forming a fluid extract of said organic liquid solute in said extractant fluid and a raffinate comprising said solvent with minor amounts of said extractant fluid and organic liquid solute, said extractant fluid being a gas at ordinary ambient conditions of temperature and pressure;
   (b) separating said fluid extract and said raffinate;
   (c) providing said fluid extract as a still feed separable into two phases by distillation;
   (d) distilling said still feed to produce a still overhead vapor and liquid still bottoms;
   (e) compressing said still overhead vapor to provide compressed vapor at an elevated temperature;
   (f) effecting indirect heat exchange between said compressed vapor and said still bottoms to provide the thermal energy required in said distilling step, and to form a liquid condensate of said vapor;
   (g) recovering a liquid bottoms product comprising said liquid solute;
   (h) recycling said liquid condensate as extractant fluid in said contacting step;
   (i) flashing off said extractant fluid from said raffinate to provide a raffinate vapor flash;
   (j) flashing off residual vapor from said still bottoms to form decompressed still bottoms; and
   (k) separating liquid organic product from said decompressed still bottoms, thereby recovering said liquid bottoms product and producing a vapor flash.

2. A process in accordance with claim 1 wherein said extractant fluid is in the near critical liquid state.

3. A process in accordance with claim 1 wherein said extractant fluid is in the supercritical state.

4. A process in accordance with claim 1 wherein said extractant fluid is carbon dioxide, ethane or ethylene.

5. A process in accordance with claim 4 wherein said extractant fluid is carbon dioxide at a pressure between about 30 and about 150 atmospheres and between about 0° C. and about 150° C.

6. A process in accordance with claim 1 wherein said organic liquid solute is an oxygenated hydrocarbon, petroleum fraction, light hydrocarbon or aromatic hydrocarbon.

7. A process in accordance with claim 6 wherein said oxygenated hydrocarbon is an alcohol, ester, acid, aldehyde, ketone or polyhydric alcohol.

8. A process in accordance with claim 6 wherein said oxygenated hydrocarbon is methanol, ethanol, isopropanol normal propanol, phenol, vinyl acetate monomer, acetic acid, methyl ethyl ketone or glycerine.

9. A process in accordance with claim 1 wherein said solvent is a petroleum fraction or water.

10. A process in accordance with claim 1 wherein said mixture of organic liquid solute and solvent forms an azeotrope and said liquid bottoms product is richer in said solute than said azeotrope would be.

11. A process in accordance with claim 1 including the steps of generating mechanical energy in reducing said pressure in step (c) and using said mechanical energy in recompressing said still overhead vapor in step (e).

12. A process in accordance with claim 1 including the subjecting of said liquid bottoms product to a process comprising steps (a) through (h).

13. A process in accordance with claim 1 including the step of subjecting said liquid bottoms product to further distillation thereby to remove residual solvent.

14. A process in accordance with claim 1 wherein said flashing off of said extractant fluid from said raffinate comprises reducing the pressure of said raffinate to a level intermediate between that of said extracting step and atmospheric and separating said raffinate vapor flash from the liquid raffinate, said raffinate vapor flash being held at said intermediate pressure.

15. A process in accordance with claim 1 including the steps of withdrawing a portion of said recompressed vapor as a slip stream prior to effecting indirect heat exchange between said recompressed vapor and said still bottoms; and effecting indirect heat exchange between said slip stream and said decompressed still bottoms prior to said separating said liquid organic product from said decompressed still bottoms.

16. A process in accordance with claim 15 including the step of adjusting the enthalpy of said slip stream prior to the effecting of indirect heat exchange between it and said decompressed still bottoms.

17. A process in accordance with claim 1 including the steps of recompressing said vapor flashes from steps (i) and (k) to render the resulting mixed fluid a solvent for said organic liquid solute; combining said resulting fluid with said liquid condensate of said vapor from step (f); and recycling the combined fluids as said extractant fluid in said contacting step.

18. A process in accordance with claim 17 including the step of adjusting the temperature of said mixed fluid prior to combining it with said liquid condensate.

19. A process in accordance with claim 17 including the step of adding makeup extractant fluid to said combined fluids prior to said recycling step.

20. A process in accordance with claim 17 including the steps of generating mechanical energy in reducing said pressure in step (c) and using said mechanical energy in recompressing said still overhead vapor in step (e).

21. A process in accordance with claim 17 including the steps of generating mechanical energy in reducing said pressure in step (c) and using said mechanical energy in recompressing said vapor flashes from steps (i) and (k).

22. A process for separating an oxygenated hydrocarbon liquid from an aqueous mixture, comprising the steps of
   (a) contacting a mixture of an oxygenated hydrocarbon liquid and water with solvent-condition carbon dioxide fluid at a pressure between about 30 and about 150 atmospheres and a temperature between about 0° and 150° C., thereby forming a carbon dioxide fluid extract of said oxygenated hydrocarbon liquid and a raffinate comprising water with minor amounts of said carbon dioxide and oxygenated hydrocarbon liquid;
   (b) separating said carbon dioxide fluid extract from said raffinate;

(c) reducing the pressure on said carbon dioxide fluid extract to form a still feed separable into two phases by distillation;
(d) distilling said still feed to produce a still overhead comprising essentially all carbon dioxide vapor and still bottoms;
(e) recompressing said carbon dioxide vapor from step (d) to provide recompressed carbon dioxide at a pressure essentially equivalent to that of said solvent-condition carbon dioxide used in step (a) and at a temperature above the boiling point of said still bottoms;
(f) effecting indirect heat exchange between said recompressed carbon dioxide and said still bottoms to provide the thermal energy required in said distilling step and to form a carbon dioxide liquid condensate;
(g) recovering a liquid bottoms product containing said oxygenated hydrocarbon;
(h) recycling said carbon dioxide liquid condensate as said solvent-condition carbon dioxide in step (a);
(i) flashing off said carbon dioxide from said raffinate to provide a raffinate carbon dioxide vapor flash;
(j) flashing off residual carbon dioxide from said still bottoms to form decompressed still bottoms;
(k) separating liquid oxygenated hydrocarbon product from said decompressed still bottoms and producing a carbon dioxide vapor flash;
(l) combining said carbon dioxide vapor flashes from steps (i) and (k);
(m) converting the combined vapor flashes to solvent-condition carbon dioxide fluid; and
(n) combining said carbon dioxide fluid of step (m) with said carbon dioxide fluid condensate of step (f).

23. A process in accordance with claim 22 wherein said oxygenated hydrocarbon is an alcohol, ester, acid, aldehyde, ketone or polyhydric alcohol.

24. A process in accordance with claim 22 wherein aqueous mixture forms an azeotrope and said liquid bottoms product is richer in said oxygenated hydrocarbon than said azeotrope would be.

25. A process in accordance with claim 22 including the steps of generating mechanical energy in reducing said pressure in step (c) and using said mechanical energy in recompressing said carbon dioxide vapor in step (e).

26. A process in accordance with claim 22 including the subjecting of said liquid bottoms product to a process comprising steps (a) through (h).

27. A process in accordance with claim 22 including the step of subjecting said liquid bottoms product to further distillation thereby to remove residual water.

28. A process in accordance with claim 22 wherein said solvent-condition carbon dioxide fluid is at about 65 atmospheres and 28° C. in step (a); said carbon dioxide vapor flashes are at about 10 atmospheres; and said still feed of steps (c) is about 50 atmospheres and 15° C.

29. A process in accordance with claim 22 including the steps of withdrawing a portion of said recompressed carbon dioxide from step (e) as a slip stream prior to step (f) and effecting indirect heat exchange between said slip stream and said decompressed still bottoms prior to said separating in step (k).

30. A process in accordance with claim 29 including the step of adjusting the enthalpy of said slip stream prior to the effecting of out-of-contact heat exchange between it and said decompressed still bottoms.

31. A process in accordance with claim 22 including the step of subjecting said liquid bottoms product to the process of steps (a)–(g) to provide a refined liquid bottoms product.

32. A process in accordance with claim 31 including the step of distilling said refined liquid bottoms product.

* * * * *